US012606310B2

(12) United States Patent
Takami et al.

(10) Patent No.: US 12,606,310 B2
(45) Date of Patent: Apr. 21, 2026

(54) COMPRESSED AIR SUPPLY SYSTEM OF AIRCRAFT

(71) Applicant: KAWASAKI JUKOGYO KABUSHIKI KAISHA, Kobe (JP)

(72) Inventors: Hiroaki Takami, Kobe (JP); Naoya Sekoguchi, Kobe (JP); Katsuhiko Ishida, Kobe (JP); Kenta Umezaki, Kobe (JP); Hiroshi Sakamoto, Kobe (JP); Tatsuhiko Goi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 388 days.

(21) Appl. No.: 18/250,903

(22) PCT Filed: Oct. 28, 2020

(86) PCT No.: PCT/JP2020/040540
§ 371 (c)(1),
(2) Date: Apr. 27, 2023

(87) PCT Pub. No.: WO2022/091273
PCT Pub. Date: May 5, 2022

(65) Prior Publication Data
US 2023/0399111 A1　　Dec. 14, 2023

(51) Int. Cl.
*B64D 13/02* (2006.01)
*B64D 13/08* (2006.01)
*B64D 35/00* (2006.01)
*B64D 13/06* (2006.01)

(52) U.S. Cl.
CPC ............. *B64D 13/02* (2013.01); *B64D 13/08* (2013.01); *B64D 35/00* (2013.01); *B64D 2013/0618* (2013.01)

(58) Field of Classification Search
CPC ........ B64D 13/02; B64D 13/08; B64D 35/00; B64D 2013/0618
USPC ........................................................ 454/71
See application file for complete search history.

(56) References Cited

U.S. PATENT DOCUMENTS

| | | | |
|---|---|---|---|
| 10,054,051 B2 | 8/2018 | Foutch et al. | |
| 11,473,497 B2 * | 10/2022 | Schwarz ................... | F02C 9/18 |
| 2013/0040545 A1 * | 2/2013 | Finney ................... | B64D 13/06 |
| | | | 454/71 |

(Continued)

FOREIGN PATENT DOCUMENTS

| | | |
|---|---|---|
| JP | 2019-528213 A | 10/2019 |
| JP | 2020-023305 A | 2/2020 |

*Primary Examiner* — Avinash A Savani
*Assistant Examiner* — Dana K Tighe
(74) *Attorney, Agent, or Firm* — Studebaker Brackett PLLC

(57) ABSTRACT

A compressed air supply system of an aircraft includes: a bleed air passage through which bleed air from a gas turbine engine flows; an auxiliary compressor including a compressor inlet and a compressor outlet, the compressor inlet being fluidly connected to the bleed air passage; a supply passage which is fluidly connected to the compressor outlet and through which compressed air from the auxiliary compressor is supplied to an air system of the aircraft; a driver that rotates the auxiliary compressor; a sensor that detects pressure or temperature of the supply passage; and circuitry that controls an output rotational frequency of the driver in accordance with a detection signal of the sensor.

6 Claims, 4 Drawing Sheets

(56)     References Cited

U.S. PATENT DOCUMENTS

| 2015/0275769 | A1 |  | 10/2015 | Foutch et al. |
| 2017/0275004 | A1 | * | 9/2017 | Bammann ................. F25B 9/08 |
| 2018/0057172 | A1 |  | 3/2018 | Sautron |
| 2018/0162537 | A1 | * | 6/2018 | Schwarz ............... B64D 27/10 |
| 2019/0309683 | A1 |  | 10/2019 | Mackin et al. |
| 2019/0383220 | A1 |  | 12/2019 | Mackin |
| 2020/0180772 | A1 |  | 6/2020 | Richardson et al. |

* cited by examiner

COMPRESSED AIR SUPPLY SYSTEM OF AIRCRAFT

CROSS-REFERENCE TO RELATED APPLICATIONS

This application is the U.S. National Stage of International Application No. PCT/JP2020/040540 filed on Oct. 28, 2020, the entire content of which is incorporated herein by reference.

TECHNICAL FIELD

The present disclosure relates to a compressed air supply system of an aircraft.

BACKGROUND ART

Conventionally, a bleed air system for an environmental control system of an aircraft is known (see PTL 1, for example). In this bleed air system, a driving shaft extending in a radial direction from a gas turbine engine is connected to a gear box, and the gear box is connected to an auxiliary compressor. The auxiliary compressor that is driven in association with the engine compresses bleed air of the engine and supplies the air to an air cycle machine (ACM).

CITATION LIST

Patent Literature

PTL 1: U.S. patent Ser. No. 10/054,051

SUMMARY OF INVENTION

Technical Problem

In this system, the rotational frequency of the auxiliary compressor is determined in proportion to the rotational frequency of the engine. Therefore, the pressure of the bleed air of the engine needs to be significantly reduced depending on the situation, and this causes energy loss. Moreover, when a factor of pressure fluctuation of a passage extending from the auxiliary compressor to the ACM exists outside the gas turbine engine, pressure cannot be supplied with a high degree of accuracy.

An object of one aspect of the present disclosure is to suppress energy loss and supply appropriate pressure to an air system of an aircraft with a high degree of accuracy.

Solution to Problem

A compressed air supply system of an aircraft according to one aspect of the present disclosure includes: a bleed air passage through which bleed air from a gas turbine engine flows; an auxiliary compressor including a compressor inlet and a compressor outlet, the compressor inlet being fluidly connected to the bleed air passage; a supply passage which is fluidly connected to the compressor outlet and through which compressed air from the auxiliary compressor is supplied to an air system of the aircraft; a driver that rotates the auxiliary compressor; a sensor that detects pressure and temperature of the supply passage; and circuitry that controls an output rotational frequency of the driver in accordance with a detection signal of the sensor.

According to the above configuration, since the rotational frequency of the auxiliary compressor is controlled by the control of the driver in accordance with the pressure or temperature of the supply passage, the compressed air from the auxiliary compressor can be prevented from being wasted. Moreover, even when the pressure or temperature of the supply passage fluctuates, this fluctuation can be absorbed by controlling the rotational frequency of the auxiliary compressor. Therefore, energy loss can be prevented, and appropriate compressed air can be supplied to the air system of the aircraft with a high degree of accuracy. The driver may be an engine power transmission (such as a continuously variable transmission or a limitless transmission) that changes the speed of the driving force of the rotating shaft of the engine and outputs the driving force or may be an electric motor that generates driving force by electric power.

Advantageous Effects of Invention

According to one aspect of the present disclosure, energy loss can be suppressed, and appropriate pressure can be supplied to an air system of an aircraft with a high degree of accuracy.

DESCRIPTION OF EMBODIMENTS

Hereinafter, embodiments will be described with reference to the drawings. In the following description, "front" denotes an upstream side in a direction in which air flows in an engine, and "rear" denotes a downstream side in the direction in which the air flows in the engine. To be specific, "front" denotes a side where a fan is located in an axial direction of a rotating shaft of the engine, and "rear" denotes an opposite side of the side where the fan is located in the axial direction of the rotating shaft of the engine. A "radial direction" denotes a direction orthogonal to a rotation axis of the rotating shaft of the engine.

Embodiment 1

Figure 1:
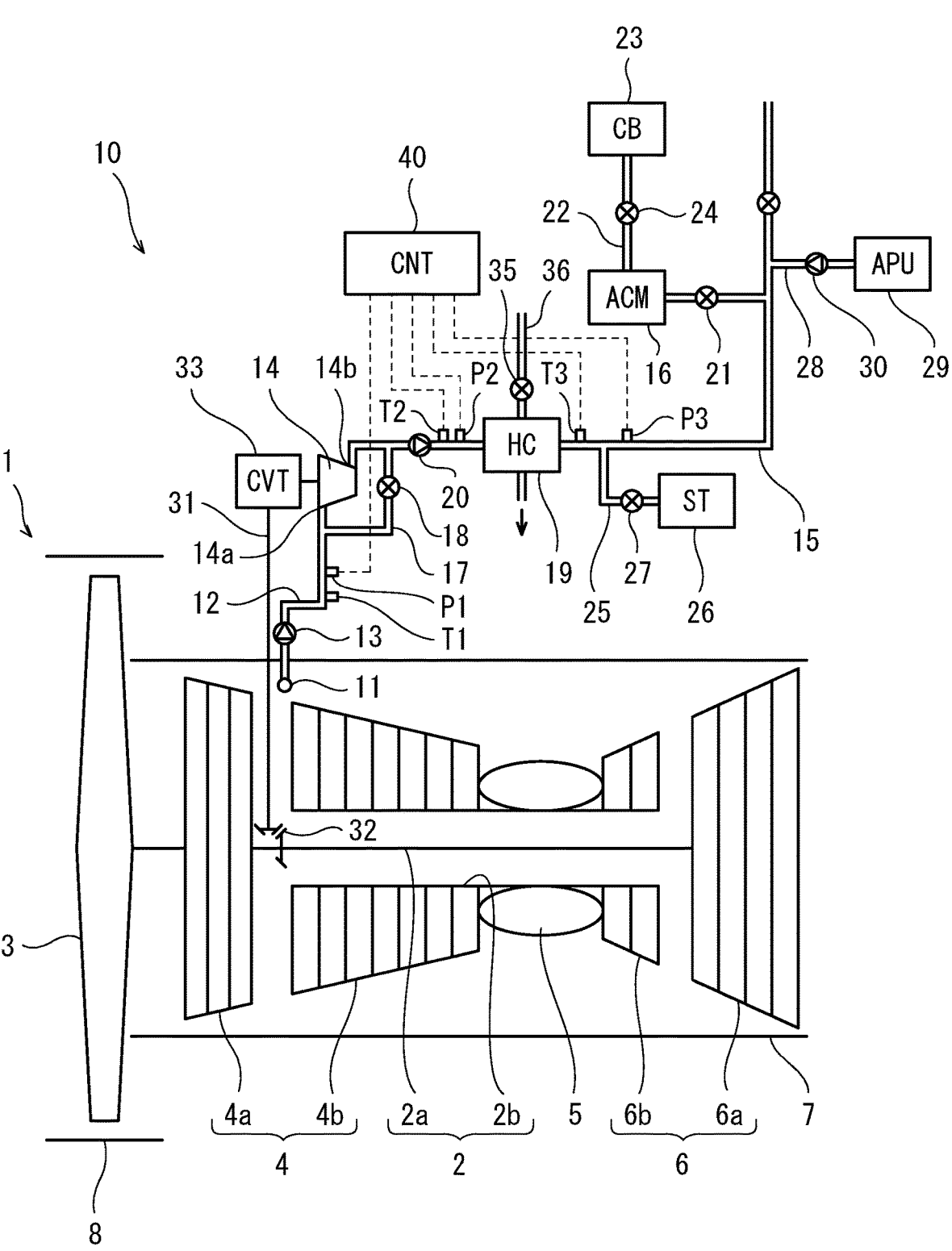
FIG. 1 is a schematic diagram showing a compressed air supply system of an aircraft according to Embodiment 1.

FIG. 1 is a schematic diagram showing a compressed air supply system 10 of an aircraft according to Embodiment 1. As shown in FIG. 1, the aircraft includes a gas turbine engine 1 and the compressed air supply system 10. The gas turbine engine 1 includes a rotating shaft 2, a fan 3, a compressor 4, a combustor 5, a turbine 6, and a casing 7. The rotating shaft 2 extends in a front-rear direction of the gas turbine engine 1. The fan 3 is connected to a front portion of the rotating shaft 2 and rotates together with the rotating shaft 2. The compressor 4, the combustor 5, and the turbine 6 are lined up along the rotating shaft 2 in this order from the front side toward the rear side. The casing 7 is a tubular body including an axis that coincides with the rotation axis of the rotating shaft 2. The casing 7 houses the rotating shaft 2, the compressor 4, the combustor 5, and the turbine 6.

The gas turbine engine 1 is a two-shaft gas turbine engine. The compressor 4 includes a low-pressure compressor 4a and a high-pressure compressor 4b located behind the low-pressure compressor 4a. The turbine 6 includes a low-pressure turbine 6a and a high-pressure turbine 6b located in front of the low-pressure turbine 6a. The rotating shaft 2 includes: a low-pressure shaft 2a that couples the low-pressure compressor 4a to the low-pressure turbine 6a; and a high-pressure shaft 2b that couples the high-pressure compressor 4b to the high-pressure turbine 6b. The high-pressure shaft 2b is a tubular shaft including a hollow space therein. The low-pressure shaft 2a is inserted into the hollow space of the high-pressure shaft 2b. The low-pressure turbine 6a is coupled through the low-pressure shaft 2a to the fan 3 located in front of the compressor 4.

A radially outer side of the fan 3 is covered with a tubular fan case 8. A cylindrical bypass passage is located between the casing 7 and the fan case 8. Air sucked by the fan 3 flows through this bypass passage and is ejected rearward to generate propulsive force.

The compressed air supply system 10 includes a bleed air passage 12 that is fluidly connected to a bleed air port 11 of the gas turbine engine 1. The bleed air port 11 supplies part of compressed air from the compressor 4 of the gas turbine engine 1 to the bleed air passage 12. The bleed air port 11 is located at an upstream side (i.e., a side close to the low-pressure compressor 4a) of the high-pressure compressor 4b in the gas turbine engine 1. The bleed air port 11 is located in, for example, a region between the low-pressure compressor 4a and the high-pressure compressor 4b. However, the bleed air port 11 may be located in a region corresponding to a portion of the low-pressure compressor 4a or a region corresponding to a portion of the high-pressure compressor 4b. With this, the compressed air compressed by the low-pressure compressor 4a flows through the bleed air passage 12.

The bleed air port 11 is fluidly connected to a compressor inlet 14a of an auxiliary compressor 14. A check valve 13 is located at the bleed air passage 12. The check valve 13 allows the flow from the bleed air port 11 toward the auxiliary compressor 14 and blocks the opposite flow. A supply passage 15 is fluidly connected to a compressor outlet 14b of the auxiliary compressor 14. The supply passage 15 supplies the compressed air, discharged from the compressor outlet 14b of the auxiliary compressor 14, to an air system of the aircraft. The air system is, for example, an air cycle machine 16 (hereinafter referred to as an "ACM") or may be a vapor compression refrigerator (VCS) or the like. FIG. 1 shows only the compressed air supply system 10 located at one of both sides of the aircraft.

A return passage 17 connected to the bleed air passage 12 is connected to the supply passage 15. The return passage 17 bypasses the auxiliary compressor 14 and connects the compressor outlet 14b to the compressor inlet 14a. A pressure regulating valve 18 that can open or close the return passage 17 is located at the return passage 17. Surging of the auxiliary compressor 14 can be prevented by opening the pressure regulating valve 18 and adjusting the opening degree of the pressure regulating valve 18. Moreover, a pressure difference between the compressor inlet 14a and the compressor outlet 14b of the auxiliary compressor 14 can be reduced, and the operation of the auxiliary compressor 14 can be made more stable.

A heat exchanger 19 (precooler) is located at the supply passage 15. A cooling medium passage 36 that uses the atmosphere as a cooling medium is located at the heat exchanger 19. A flow regulating valve 35 is located at the cooling medium passage 36. The heat exchanger 19 uses the atmosphere as the cooling medium to cool the compressed air flowing through the supply passage 15. A pressure regulating valve 21 is located at the supply passage 15 and in the vicinity of an inlet of the ACM 16. An outlet of the ACM 16 is fluidly connected to a passenger room 23 through a supply passage 22. A pressure regulating valve 24 is located at the supply passage 22. The heat exchanger 19 may use, as the cooling medium, bypass air flowing through the bypass passage or may use a cooling liquid while circulating the cooling liquid.

An engine starter 26 is fluidly connected through a first auxiliary passage 25 to a portion of the supply passage 15 which is located downstream of the heat exchanger 19. An on-off valve 27 is located at the first auxiliary passage 25. An auxiliary power unit 29 (APU) is fluidly connected through a second auxiliary passage 28 to a portion of the supply passage 15 which is located downstream of the heat exchanger 19. A check valve 30 is located at the second auxiliary passage 28. The check valve 30 allows the flow from the APU 29 toward the supply passage 15. The supply passage 15 also extends to an anti-icing system, a deicing system, an inactive gas generating system, and the like.

A pressure sensor P1 is located at the bleed air passage 12. A pressure sensor P2 is located at a portion of the supply passage 15 which is located between the auxiliary compressor 14 and the heat exchanger 19. The pressure sensor P2 practically detects the pressure of the compressor outlet 14b of the auxiliary compressor 14. A pressure sensor P3 is located at a portion of the supply passage 15 which is located downstream of the heat exchanger 19. For example, the pressure sensor P3 is located at a portion of the supply passage 15 which is located between the APU 29 and the engine starter 26.

A temperature sensor T1 is located at the bleed air passage 12. A temperature sensor T2 is located at a portion of the supply passage 15 which is located between the auxiliary compressor 14 and the heat exchanger 19. A temperature sensor T3 is located at a portion of the supply passage 15 which is located downstream of the heat exchanger 19. For example, the temperature sensor T3 is located at a portion of the supply passage 15 which is located between the heat exchanger 19 and the first auxiliary passage 25.

There is a driver that drives the auxiliary compressor 14. In the present embodiment, an engine power transmission (continuously variable transmission 33) is used as the driver and transmits driving force from the gas turbine engine 1 to the auxiliary compressor. A power extracting shaft 31 extending in the radial direction is mechanically connected to the low-pressure shaft 2a of the gas turbine engine 1 through a bevel gear 32. To be specific, the power extracting shaft 31 rotates in association with the low-pressure shaft 2a. The power extracting shaft 31 may be mechanically connected to the high-pressure shaft 2b and may rotate in association with the high-pressure shaft 2b. The power extracting shaft 31 is mechanically connected to an input shaft of the continuously variable transmission 33 (engine power transmission). An output shaft of the continuously variable transmission 33 (engine power transmission) is mechanically connected to a driven shaft of the auxiliary compressor 14. To be specific, the continuously variable transmission 33 (engine power transmission) changes the speed of the driving force from the low-pressure shaft 2a of the gas turbine engine 1 to appropriate rotational frequency and transmits the changed driving force to the auxiliary compressor 14 to rotate the auxiliary compressor 14. For example, a toroidal continuously variable transmission is suitably used as the continuously variable transmission 33.

The pressure sensors P1 to P3 and the temperature sensors T1 to T3 are electrically connected to circuitry 40. The circuitry 40 controls a change gear ratio of the continuously variable transmission 33 and the opening degree of the pressure regulating valve 18 in accordance with detection signals of the pressure sensors P1 to P3 and the temperature sensors T1 to T3. To be specific, the circuitry 40 controls an output rotational frequency of the continuously variable transmission 33 by controlling the change gear ratio of the continuously variable transmission 33. The circuitry 40 may also control the valves 21, 24, 27, and 35 and the like.

The circuitry 40 may control the change gear ratio of the continuously variable transmission 33 such that the pressure of the supply passage 15 (i.e., the pressure of the compressor outlet 14*b*) which is detected by the pressure sensor P2 approaches required pressure. The required pressure required of the pressure of the supply passage 15 which is detected by the pressure sensor P2 or P3 is set within a predetermined allowable range that does not fall below a highest one of the required pressure of the ACM 16 and the required pressures of the other air pressure systems (such as an engine start system (engine starter 26), an anti-icing system, a deicing system, and an inactive gas generating system) to which the supply passage 15 extends. The circuitry 40 may adjust the pressure of the supply passage 15 to desired pressure by controlling the change gear ratio of the continuously variable transmission 33 based on a pressure difference between the pressure of the bleed air passage 12 which is detected by the pressure sensor P1 and the pressure of the supply passage 15 which is detected by the pressure sensor P2.

When an absolute value of a time change rate of the pressure of the bleed air passage 12 which is detected by the pressure sensor P1 or an absolute value of a time change rate of the pressure of the supply passage 15 which is detected by the pressure sensor P2 exceeds a threshold, the circuitry 40 may suppress pressure fluctuation in the supply passage 15 by changing the opening degree of the pressure regulating valve 18. For example, when the time change rate of the pressure of the bleed air passage 12 increases and exceeds a positive threshold, the circuitry 40 may increase the opening degree of the pressure regulating valve 18 to quickly suppress a sudden pressure increase of the supply passage 15. In this case, when the absolute value of the time change rate of the pressure of the bleed air passage 12 is the threshold, the circuitry 40 may fully close the pressure regulating valve 18.

For example, when the time change rate of the pressure of the bleed air passage 12 decreases and falls below a negative threshold, the circuitry 40 may reduce the opening degree of the pressure regulating valve 18 to quickly suppress a sudden pressure decrease of the supply passage 15. In this case, when the absolute value of the time change rate of the pressure of the bleed air passage 12 is the threshold, the circuitry 40 may set the opening degree of the pressure regulating valve 18 to an intermediate opening degree (for example, an opening degree that is larger than zero and smaller than a middle opening degree).

The circuitry 40 adjusts the degree of cooling of the heat exchanger 19 by controlling the opening degree of the flow regulating valve 35 such that the temperature of the temperature sensor T3 approaches a required temperature. The circuitry 40 may adjust the temperature of the supply passage 15 to a desired temperature by controlling the change gear ratio of the continuously variable transmission

33 based on the temperatures of the supply passage 15 which are detected by the temperature sensors T1, T2, and T3.

The circuitry 40 includes a processor, a memory, an I/O interface, and the like. The memory includes a storage (such as a hard disk and a flash memory) and a main memory (RAM). The memory stores a program including commands that execute the above control. The program included in the circuitry 40 may be dispersed to circuitries. The circuitry 40 does not have to be used only for the compressed air supply system 10 and may also serve as circuitry of another system. The program for the compressed air supply system 10 may be integrated with a program of another system.

According to the above-described configuration, since the rotational frequency of the auxiliary compressor 14 is controlled by the control of the continuously variable transmission 33 in accordance with the pressure of the supply passage 15, the pressure of the compressed air from the auxiliary compressor 14 can be prevented from being wasted. Moreover, even when the pressure fluctuation of the supply passage 15 occurs, the pressure fluctuation can be absorbed by controlling of the rotational frequency of the auxiliary compressor 14. Therefore, the energy loss can be prevented, and appropriate pressure can be supplied to the ACM 16 with a high degree of accuracy. Instead of using the engine power transmission, such as the continuously variable transmission 33 driven by the gas turbine engine 1, as the driver, an electric motor that generates the driving force by electric power may be used as the driver.

Moreover, when sudden pressure fluctuation occurs in the supply passage 15, the pressure regulating valve 18 of the return passage 17 is controlled, and with this, pressure adjustment can be performed with high responsiveness. On the other hand, when moderate pressure fluctuation occurs in the supply passage 15, the pressure of the compressor outlet 14*b* is adjusted by the continuously variable transmission 33, and with this, the energy loss caused by the pressure reduction of the pressure regulating valve 18 can be suppressed. Furthermore, since the bleed air passage 12 is fluidly connected to the bleed air port 11 of the low-pressure compressor 4*a* of the gas turbine engine 1, the pressure of the bleed air hardly becomes higher than the required pressure. Therefore, the energy loss caused by the pressure reduction can be reduced in all flight steps from takeoff to landing.

Embodiment 2

Figure 2:
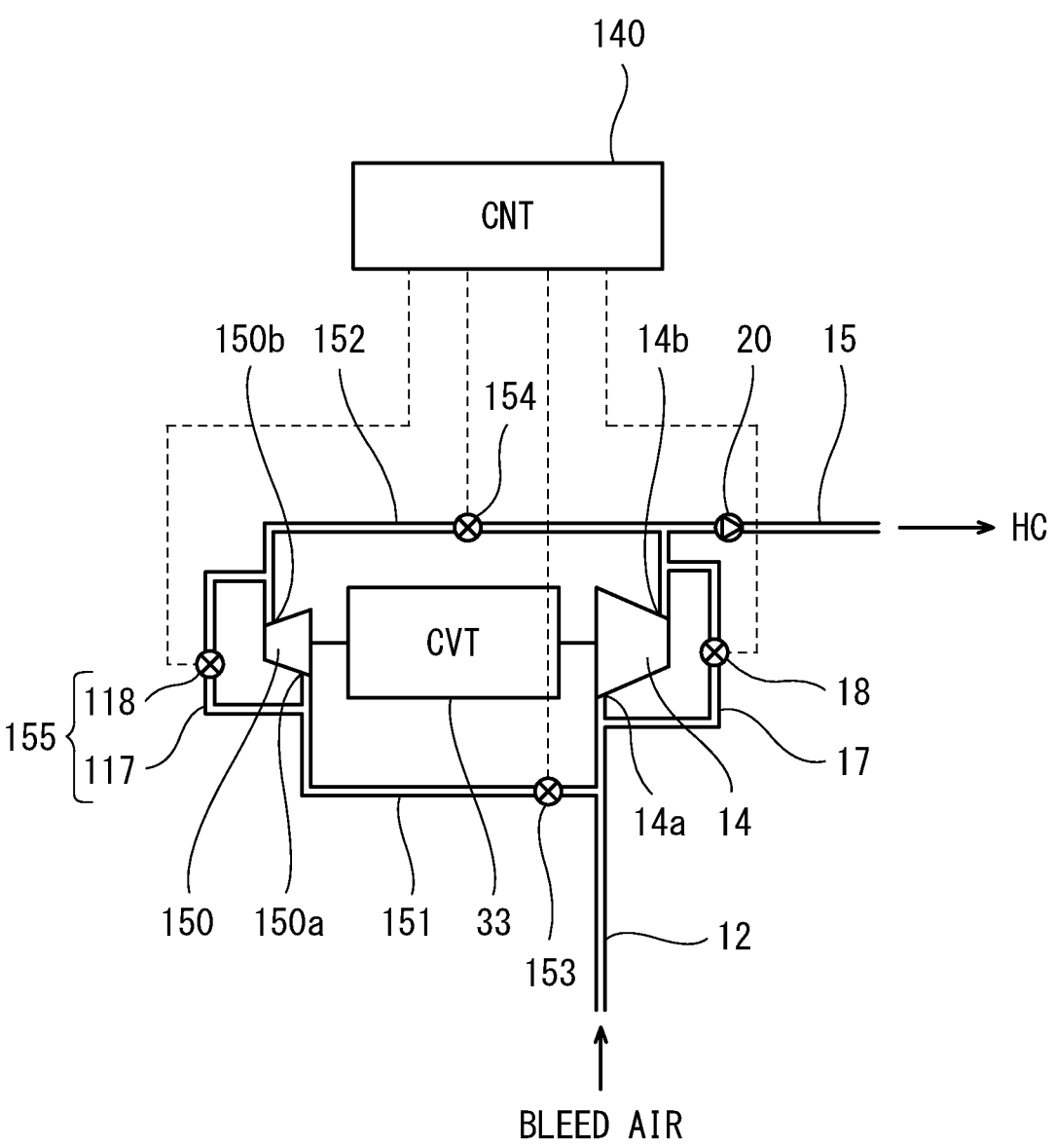
FIG. 2 is a schematic diagram showing major components of the compressed air supply system of the aircraft according to Embodiment 2.

FIG. 2 is a schematic diagram showing major components of the compressed air supply system of the aircraft according to Embodiment 2. The same reference signs are used for the same components as in Embodiment 1, and the repetition of the same explanation is avoided. As shown in FIG. 2, in Embodiment 2, the auxiliary compressor 14 of Embodiment 1 is referred to as a first auxiliary compressor, and a second auxiliary compressor 150 is connected in parallel with the first auxiliary compressor 14. The compression performance of the second auxiliary compressor 150 may be lower than the compression performance of the first auxiliary compressor 14. To be specific, the second auxiliary compressor 150 may be smaller in size than the first auxiliary compressor 14.

A compressor inlet 150*a* of the second auxiliary compressor 150 is fluidly connected to the bleed air passage 12 through a branch bleed air passage 151. A compressor outlet 150*b* of the second auxiliary compressor 150 is fluidly connected to the supply passage 15 through a branch supply passage 152. An on-off valve 153 is located at the branch bleed air passage 151, and an on-off valve 154 is located at the branch supply passage 152.

The second auxiliary compressor 150 is driven by the continuously variable transmission 33 that changes the speed of the driving force of the gas turbine engine 1 and outputs the driving force. To be specific, the first auxiliary compressor 14 and the second auxiliary compressor 150 can be driven by the output shaft of the continuously variable transmission 33. The first auxiliary compressor 14 and the second auxiliary compressor 150 may be respectively driven by output shafts of separate continuously variable transmissions. The first auxiliary compressor 14 operates in association with the output shaft of the continuously variable transmission 33 at all times. The second auxiliary compressor 150 is switchable between a compression state and a non-compression state by a switching structure 155. The switching structure 155 includes a second return passage 117 and a second pressure regulating valve 118.

The second return passage 117 bypasses the second auxiliary compressor 150 and fluidly connects the branch supply passage 152 to the branch bleed air passage 151. To be specific, the second return passage 117 bypasses the second auxiliary compressor 150 and connects the compressor outlet 150b to the compressor inlet 150a. The second pressure regulating valve 118 that can open or close the second return passage 117 is located at the second return passage 117. When the second auxiliary compressor 150 is being driven, and the second pressure regulating valve 118 is in a closed state, the second auxiliary compressor 150 becomes the compression state. When the second auxiliary compressor 150 is being driven, and the second pressure regulating valve 118 opens, the second auxiliary compressor 150 becomes the non-compression state. By adjusting the opening degree of the second pressure regulating valve 118, the pressure of the compressor outlet 150b of the second auxiliary compressor 150 can be adjusted with high responsiveness.

During a normal time, circuitry 140 closes the on-off valves 153 and 154 and opens the second pressure regulating valve 118. To be specific, during the normal time, the bleed air of the bleed air passage 12 is not supplied to the second auxiliary compressor 150, and the second auxiliary compressor 150 idles. When the circuitry 140 receives an emergency signal (for example, a failure signal of the compressed air supply system at one side of the aircraft) which requests an increase in the flow rate of the compressed air supplied to the ACM 16, the circuitry 140 opens the on-off valves 153 and 154 and closes the second pressure regulating valve 118.

According to this configuration, in an emergency which requires the increase in the flow rate of the compressed air supplied to the ACM 16, the second auxiliary compressor 150 assists the first auxiliary compressor 14. Therefore, the first auxiliary compressor 14 does not have to operate at the rotational frequency that is low in efficiency. On this account, the increase in the flow rate of the compressed air supplied to the ACM 16 can be achieved while avoiding the deterioration of the efficiency of the first auxiliary compressor 14.

Figure 3:
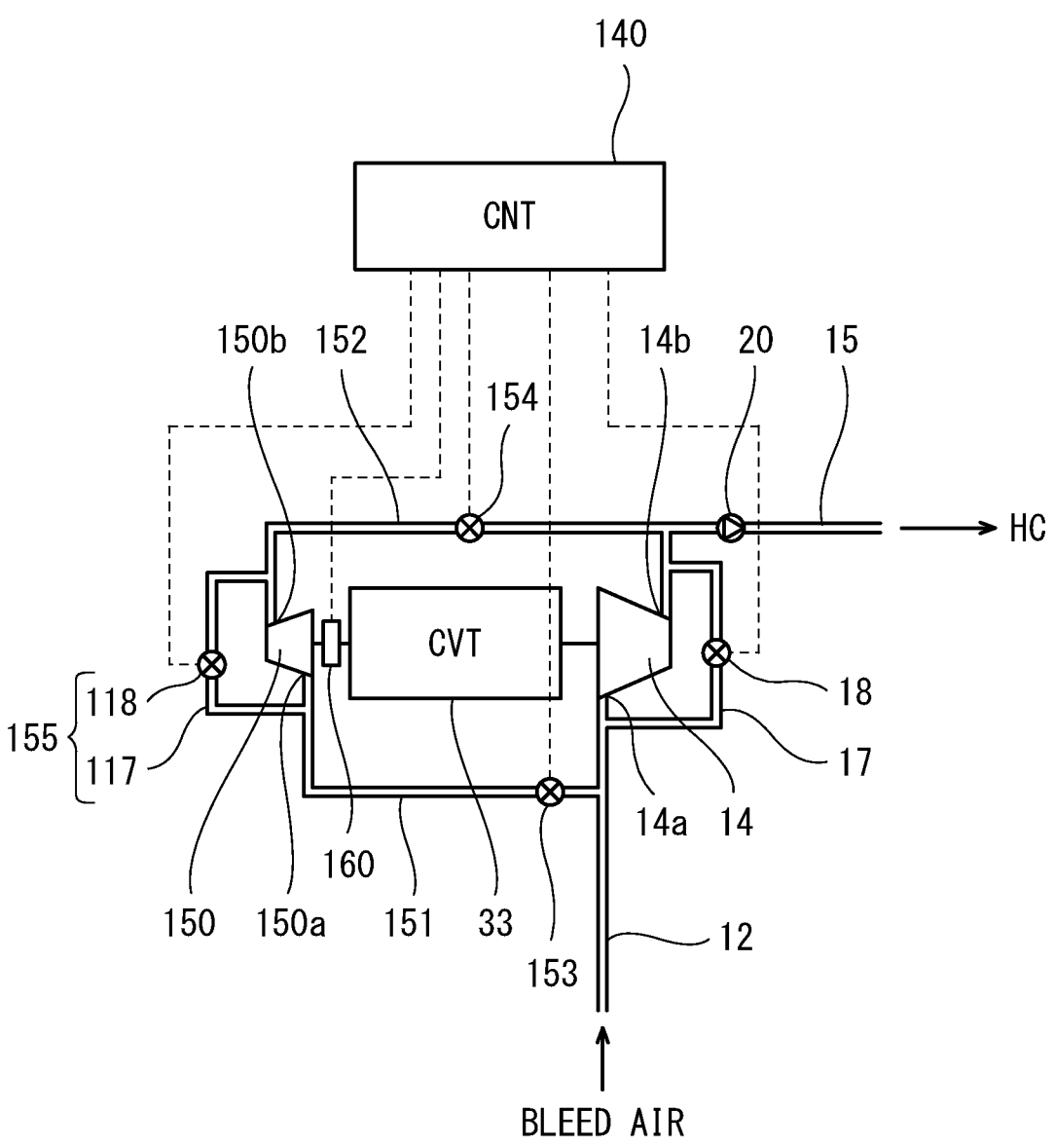
FIG. 3 is a schematic diagram showing a modified example of the system of FIG. 2.

FIG. 3 is a schematic diagram showing a modified example of the system of FIG. 2. The same reference signs are used for the same components as in FIG. 2, and the repetition of the same explanation is avoided. As shown in FIG. 3, in the present modified example, a clutch 160 is used as the switching structure. The clutch 160 can cut a power transmitting path between the second auxiliary compressor 150 and the continuously variable transmission 33. The clutch 160 is, for example, an electromagnetic clutch. The second return passage 117 and the second pressure regulating valve 118 may be omitted. Or, the second return passage 117 and the second pressure regulating valve 118 may be included to suppress sudden pressure fluctuation.

During the normal time, the circuitry 140 sets the clutch 160 to a cut state. To be specific, during the normal time, the second auxiliary compressor 150 is not driven by the continuously variable transmission 33. When the circuitry 140 receives the emergency signal (for example, the failure signal of the compressed air supply system at one side) which requests the increase in the flow rate of the compressed air supplied to the ACM 16, the circuitry 140 sets the clutch 160 to an engaged state. According to this configuration, the second auxiliary compressor 150 can be easily switched between the compression state and the non-compression state.

Embodiment 3

Figure 4:
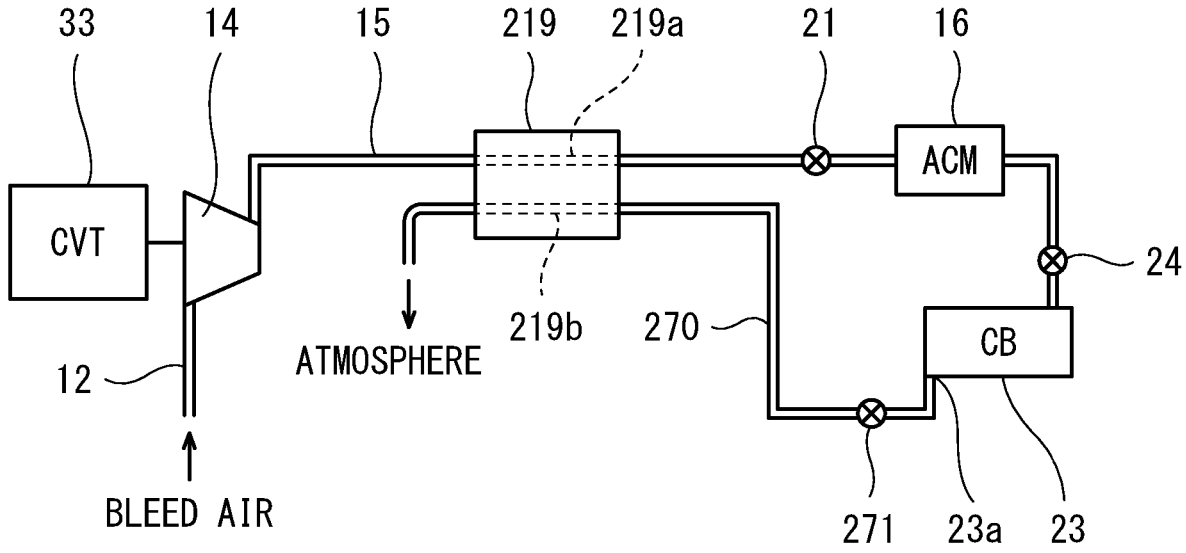
FIG. 4 is a schematic diagram showing major components of the compressed air supply system of the aircraft according to Embodiment 3.

FIG. 4 is a schematic diagram showing major components of the compressed air supply system of the aircraft according to Embodiment 3. The same reference signs are used for the same components as in Embodiment 1, and the repetition of the same explanation is avoided. As shown in FIG. 4, a heat exchanger 219 is located at a portion of the supply passage 15 which is located between the auxiliary compressor 14 and the ACM 16, and the heat exchanger 219 uses exhaust of the passenger room 23 as a cooling medium.

The heat exchanger 219 includes a target passage 219a and a cooling medium passage 219b. The target passage 219a is fluidly connected to the supply passage 15, and the cooling medium passage 219b cools the compressed air flowing through the target passage 219a. An exhaust port 23a of the passenger room 23 is fluidly connected to the cooling medium passage 219b of the heat exchanger 219 through an exhaust passage 270. A flow regulating valve 271 is located at the exhaust passage 270. An outlet of the cooling medium passage 219b of the heat exchanger 219 is open to the atmosphere.

While the aircraft is flying at a high altitude, the pressure of the atmosphere is about 0.2 to 0.3 atmospheric pressure, and the pressure of the passenger room 23 is about 0.7 to 1.0 atmospheric pressure. To be specific, the pressure of the passenger room 23 is about three to five times the pressure of the atmosphere. Moreover, the temperature of the passenger room 23 is lower than the temperature of the compressor outlet 14b of the auxiliary compressor 14 by about 200° C. Therefore, during the flight, the passenger room exhaust that is lower in temperature than the compressor outlet 14b is higher in density than the atmosphere and is ejected at high speed. On this account, heat exchange is efficiently performed by the heat exchanger 219, and the compressed air of the supply passage 15 can be cooled.

The present disclosure is not limited to the above embodiments. Modifications, additions, and eliminations may be made with respect to the configurations of the embodiments. For example, some of components in one embodiment or one modified example may be separated and arbitrarily extracted from the other components in the embodiment or the modified example. Some of components in one embodiment or one modified example may be applied to another embodiment or another modified example.

The invention claimed is:
1. A compressed air supply system of an aircraft,
the compressed air supply system comprising:

a bleed air passage through which bleed air from a gas turbine engine flows;

an auxiliary compressor including a compressor inlet and a compressor outlet, the compressor inlet being fluidly connected to the bleed air passage;

a supply passage which is fluidly connected to the compressor outlet and through which compressed air from the auxiliary compressor is supplied to an air system of the aircraft;

a continuously variable transmission that rotates the auxiliary compressor by changing a speed of a driving force of a rotating shaft of the gas turbine engine and outputting the driving force to the auxiliary compressor;

a first pressure sensor that detects a pressure of the bleed air passage;

a second pressure sensor that detects a pressure of the supply passage; and circuitry that controls an output rotational frequency of the continuously variable transmission by controlling a change gear ratio of the continuously variable transmission in accordance with a detection signal of the first pressure sensor and a detection signal of the second pressure sensor, wherein the circuitry adjusts the pressure of the supply passage to a desired pressure by controlling the change gear ratio of the continuously variable transmission based on a pressure difference between the pressure of the bleed air passage detected by the first pressure sensor and the pressure of the supply passage detected by the second pressure sensor.

2. The compressed air supply system according to claim 1, wherein:

the gas turbine engine includes a low-pressure compressor and a high-pressure compressor; and the bleed air passage is fluidly connected to at least one of a bleed air port of the low-pressure compressor of the gas turbine engine or a bleed air port of the high-pressure compressor of the gas turbine engine.

3. The compressed air supply system according to claim 1, further comprising:

a heat exchanger including
a target passage fluidly connected to the supply passage and
a cooling medium passage that cools the compressed air flowing through the target passage; and an exhaust passage that connects an exhaust port of a passenger room to an inlet of the cooling medium passage, wherein an outlet of the cooling medium passage is open to atmosphere.

4. A compressed air supply system of an aircraft,
the compressed air supply system comprising:
a bleed air passage through which bleed air from a gas turbine engine flows;

an auxiliary compressor including a compressor inlet and a compressor outlet, the compressor inlet being fluidly connected to the bleed air passage;

a supply passage which is fluidly connected to the compressor outlet and through which compressed air from the auxiliary compressor is supplied to an air system of the aircraft;

a return passage which extends from the supply passage and through which the compressed air from the auxiliary compressor is supplied to the bleed air passage;

a pressure regulating valve that opens or closes the return passage;

a driver that rotates the auxiliary compressor;

a sensor that detects a pressure of the bleed air passage or the supply passage; and circuitry that controls an output rotational frequency of the driver in accordance with a detection signal of the sensor, wherein when an absolute value of a time change rate of the pressure detected by the sensor exceeds a threshold, the circuitry controls an opening degree of the pressure regulating valve such that a pressure fluctuation in the supply passage is suppressed.

5. A compressed air supply system of an aircraft,
the compressed air supply system comprising:

a bleed air passage through which bleed air from a gas turbine engine flows;

a first auxiliary compressor including a compressor inlet and a compressor outlet, the compressor inlet being fluidly connected to the bleed air passage;

a supply passage which is fluidly connected to the compressor outlet and through which compressed air from the first auxiliary compressor is supplied to an air system of the aircraft;

a driver that rotates the first auxiliary compressor;

a second auxiliary compressor that includes a compressor inlet and a compressor outlet, is connected in parallel with the first auxiliary compressor, and is rotated by the driver, the compressor inlet being fluidly connected to the bleed air passage, the compressor outlet being fluidly connected to the supply passage;

a switching structure that switches the second auxiliary compressor between a compression state and a non-compression state;

a sensor that detects a pressure or a temperature of the supply passage; and circuitry that controls an output rotational frequency of the driver in accordance with a detection signal of the sensor, wherein the switching structure includes
a second return passage that bypasses the second auxiliary compressor and connects the compressor outlet of the second auxiliary compressor to the compressor inlet of the second auxiliary compressor and
a second pressure regulating valve that opens or closes the second return passage.

6. The compressed air supply system according to claim 5, wherein the switching structure includes a clutch that cuts a power transmitting path between the second auxiliary compressor and the driver.

* * * * *